UNITED STATES PATENT OFFICE.

ANDREW SOLOMONOFF, OF SYRACUSE, NEW YORK, ASSIGNOR TO THE WILL & BAUMER COMPANY, OF SYRACUSE, NEW YORK, A CORPORATION OF NEW YORK.

PROCESS OF RAISING THE MELTING-POINTS OF FATTY ACIDS.

1,002,186. Specification of Letters Patent. Patented Aug. 29, 1911.

No Drawing. Application filed August 31, 1908. Serial No. 450,951.

*To all whom it may concern:*

Be it known that I, ANDREW SOLOMONOFF, of Syracuse, in the county of Onondaga, in the State of New York, have invented new and useful Improvements in Processes of Raising the Melting-Points of Fatty Acids, of which the following is a full, clear, and exact description.

This invention relates to a process of hardening fats, stearic acid, palmitic acid and other fatty acids, naphtha acids, commonly known as sludge acid, waxes and the like.

The object of this process is the hardening of such materials for the purpose of raising the melting point and making the material amorphous so that the same may be used for the manufacture of candles; also for the purpose of rendering stearic acid and similar materials hard so that they may be used for insulating and other purposes in the art.

My further object is to provide a process by which the above named materials may be rendered harder and have a firm body so that the materials may be used in the arts in which they cannot now be used by reason of their low melting point.

To illustrate,—the best quality of ordinary commercial stearic acid melts at from 128° to 130° F. By this process I am able to very materially increase the melting point and render amorphous the same at a very small additional cost.

One concrete method of carrying out this invention is to treat the foregoing materials in either a solid, powdered or granular form with an anhydrous alkali, either organic or inorganic.

I do not limit myself to any particular anhydrous alkali, as I have found that various anhydrous alkalis such as ammonia and anhydrous salts of ammonia or other alkalis with carbonic or certain other acids will produce the effect and accomplish the object desired.

By anhydrous alkalis, it is meant ammonia gas $NH_3$; sodium oxid $Na_2O$; potassium oxid $K_2O$; dry sodium caustic $NaOH$; and dry potassim caustic $KOH$.

I have found by practice and experience that by treating the material either in a granular, powdered or solid condition with an anhydrous ammonia $NH_3$ a reaction takes place producing an anhydrous ammonia salt which hardens the material and raises its melting point.

An example giving quantities used and details of preparation is as follows: Powdered fatty acids are mixed with $NH_3$ ammonia, by passing through the said fatty acids a stream of ammonia gas $NH_3$ or they are mixed with said dry alkalis or salts of alkalis for five or six hours. If salts of volatile acids are used they give off the acids and form dry salts of fatty acids and ammonia, sodium or potassium. These salts are mixed with uncombined free fatty acids. If salts of weak non-volatile acids, for instance ammonium borate, are used they form the same salts of fatty acids and ammonia, sodium or potassium. These salts can be separated from free boric acid by melting the product; boric acid goes to the bottom. The quantities of alkalis used are different according to the alkalis and to the desired product. For instance, I use ammonium $NH_3$ from 0.5% to 4.55. The more ammonia or other salts used, the higher is the melting point of the product and the harder is the product.

The anhydrous ammonia $NH_3$ is allowed to freely commingle with the oils and fats for a period depending upon the amount to be treated with the anhydrous ammonia $NH_3$. The harder, it is desired to render the substance acted upon the more anhydrous ammonia $NH_3$ should be used. The reaction, however, which takes place is to make the anhydrous ammonia $NH_3$ combine with the fats or fatty acids to form an anhydrous ammonia salt which permeates the fatty material, raises its melting point for the purpose specified and for any other use to which the same may be used in the arts.

What I claim is:—

1. The process of raising the melting points of fatty acids thereby producing a harder and amorphous material consisting in treating the fatty acids in a granular or powdered or solid condition with an anhydrous alkali.

2. A process of raising the melting points of fatty acids for producing a harder and amorphous material consisting in treating the fatty acids in a granular or powdered solid condition with anhydrous ammonia $NH_3$.

3. The process of raising the melting points of fatty acids thereby producing a harder and amorphous material consisting of treating the fatty acids in a granular or powdered solid condition with anhydrous alkali.

4. The process of combining an anhydrous alkali with fatty acids thereby producing a harder and amorphous material which consists in powdering or granulating the fatty acids and then mixing therewith an anhydrous alkali salt.

5. A process combining ammonia with fatty acids thereby producing a harder and amorphous material consisting in powdering or granulating the material to be treated, then mixing therewith an anhydrous ammonia salt whereby the ammonia will combine with the fatty acids forming anhydrous ammonia salt.

In witness whereof I have hereunto set my hand this 27th day of August, 1908.

ANDREW SOLOMONOFF.

Witnesses:
 ANTHONY N. MARKERT,
 EDMUND BAUMER.

Copies of this patent may be obtained for five cents each, by addressing the "Commissioner of Patents Washington, D. C."